(12) United States Patent
Smague et al.

(10) Patent No.: US 9,702,268 B2
(45) Date of Patent: Jul. 11, 2017

(54) DEVICE FOR CONTROLLING A WORKING FLUID IN A CLOSED CIRCUIT OPERATING ACCORDING TO THE RANKINE CYCLE, AND METHOD USING SAID DEVICE

(71) Applicant: IFP Energies nouvelles, Rueil-Malmaison (FR)

(72) Inventors: Pascal Smague, Rueil-Malmaison (FR); Pierre Leduc, Beynes (FR); Richard Levesque, Le Chesnay (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 0 days.

(21) Appl. No.: 14/372,525

(22) PCT Filed: Dec. 14, 2012

(86) PCT No.: PCT/FR2012/000522
§ 371 (c)(1),
(2) Date: Jul. 16, 2014

(87) PCT Pub. No.: WO2013/107949
PCT Pub. Date: Jul. 25, 2013

(65) Prior Publication Data
US 2015/0013338 A1     Jan. 15, 2015

(30) Foreign Application Priority Data
Jan. 18, 2012   (FR) ..................................... 12 00158

(51) Int. Cl.
*F01K 13/02*     (2006.01)
*F01N 5/02*     (2006.01)
(Continued)

(52) U.S. Cl.
CPC ................ *F01K 1/16* (2013.01); *F01K 13/02* (2013.01); *F01K 23/065* (2013.01); *F01N 5/02* (2013.01);
(Continued)

(58) Field of Classification Search
CPC .......... F01K 1/16; F01K 13/02; F01K 23/065; F01N 5/02; F02G 5/02; Y02T 10/16; Y02T 10/166
See application file for complete search history.

(56) References Cited

U.S. PATENT DOCUMENTS

| | | | |
|---|---|---|---|
| 6,829,894 B2* | 12/2004 | Bloch | ..................... F01K 13/00 60/646 |
| 2009/0151356 A1* | 6/2009 | Ast | ....................... F01K 23/101 60/660 |

(Continued)

FOREIGN PATENT DOCUMENTS

CN            102230401 A   *   11/2011

*Primary Examiner* — Audrey K Bradley
(74) *Attorney, Agent, or Firm* — Fitch, Even, Tabin & Flannery, LLP

(57) ABSTRACT

In a device for controlling a working fluid with low freezing point circulating in a closed loop working on a Rankine cycle, the loop includes a compression/circulation pump for the fluid in liquid form, a heat exchanger swept by a hot source for evaporation of the fluid, expansion machine for the fluid in vapour form, a cooling exchanger swept by a cold source for condensation of the working fluid, a working fluid tank and working fluid circulation lines. The working fluid tank is connected to a depression generator.

17 Claims, 1 Drawing Sheet

(51) Int. Cl.
*F02G 5/02* (2006.01)
*F01K 1/16* (2006.01)
*F01K 23/06* (2006.01)

(52) U.S. Cl.
CPC ............... *F02G 5/02* (2013.01); *Y02T 10/16* (2013.01); *Y02T 10/166* (2013.01)

(56) References Cited

U.S. PATENT DOCUMENTS

2011/0192178 A1* 8/2011 Ternel ................ F01K 23/065 62/118
2012/0210713 A1* 8/2012 Ernst .................... F01N 5/02 60/615

* cited by examiner

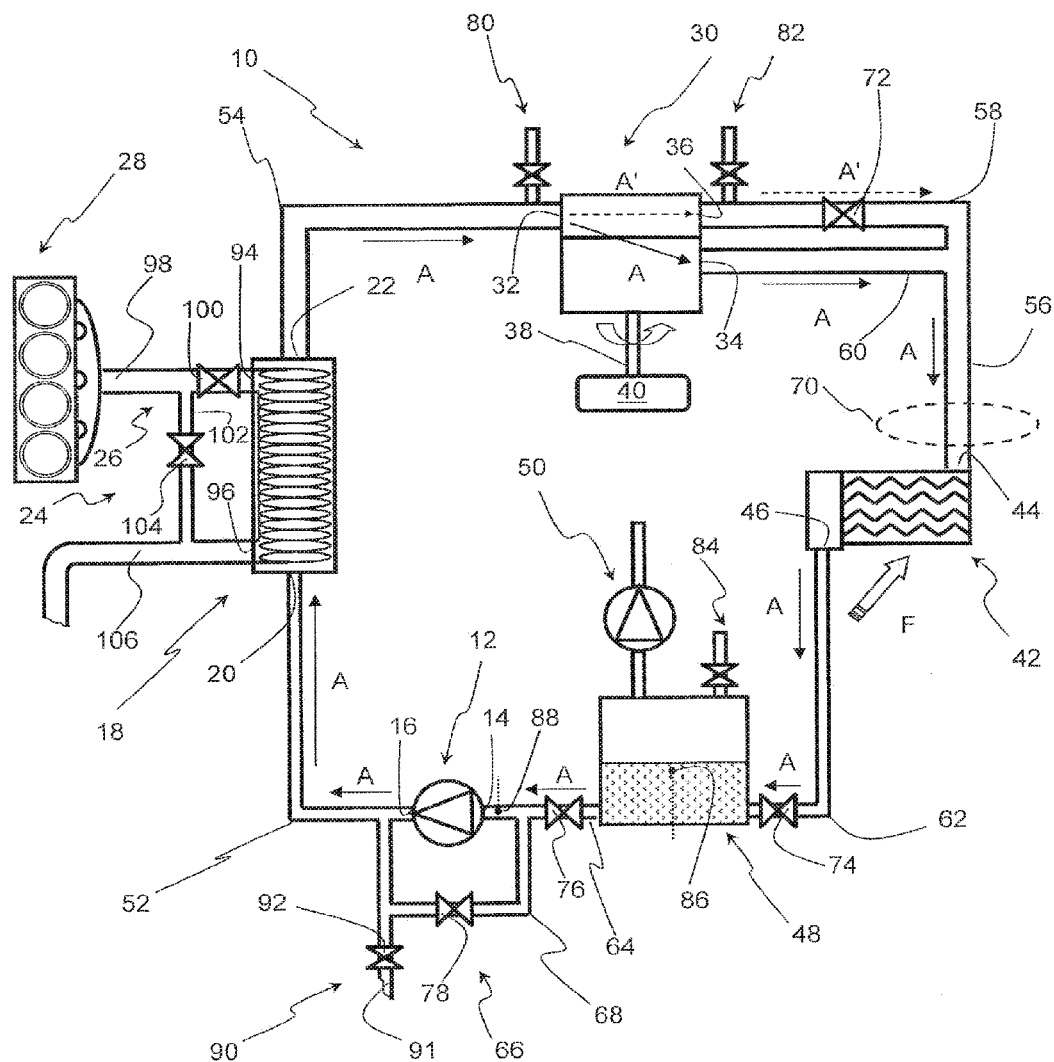

DEVICE FOR CONTROLLING A WORKING FLUID IN A CLOSED CIRCUIT OPERATING ACCORDING TO THE RANKINE CYCLE, AND METHOD USING SAID DEVICE

FIELD OF THE INVENTION

The present invention relates to a device for controlling a working fluid contained in a closed loop working on a Rankine cycle, and to a method using same.

As it is widely known, a Rankine cycle is a thermodynamic cycle wherein heat coming from an external heat source is transmitted to a closed loop containing a working fluid.

This cycle is generally broken down into a stage wherein the working fluid with low freezing point, generally water, is compressed in an isentropic manner, followed by a stage where this compressed water is heated and vaporized on contact with a heat source. This water vapour is then expanded, in another stage, in an isentropic manner in an expansion machine, then, in a last stage, this expanded vapour is cooled and condensed on contact with a cold source.

To carry out these various stages, the loop comprises a positive-displacement pump for compressing the water in liquid form and circulating it in the loop, a heat exchanger (or evaporator) that is swept by a hot fluid for at least partial vaporization of the compressed water, an expansion machine for expanding the vapour, such as a turbine that converts the energy of this vapour into another energy such as a mechanical or electrical energy, and another heat exchanger (or condenser) by means of which the heat contained in the vapour is yielded to a cold source, generally outside air that sweeps this condenser so as to convert this vapour into water in liquid form.

BACKGROUND OF THE INVENTION

It is also well known, notably through document FR-2,884,555, to use the calorific energy conveyed by the exhaust gas of internal-combustion engines, in particular those used for motor vehicles, as the hot source providing heating and vaporization of the fluid flowing through the evaporator.

This allows to improve the energy efficiency of this engine by recovering a large part of the energy lost at the exhaust in order to convert it to an energy that can be used for the motor vehicle through the Rankine cycle loop.

As it is widely known, using an aqueous working fluid in a Rankine cycle loop affords the advantage of having characteristics that allow to obtain a maximum saturation curve while having the advantage of not being dangerous.

However, this water has the specific feature of having a freezing point at low temperatures (around 0° C.) and antifreeze additives such as glycol are usually added thereto in order to lower this freezing point to acceptable temperature levels, of the order of −15° C. to −30° C.

Adding such additives has the drawback of changing the characteristics of the water, in particular its vaporization characteristics, and the hot source from the exhaust gas may be insufficient to perform this vaporization in a satisfactory manner.

Furthermore, in the course of time, this additive-containing water undergoes unpredictable aging as the liquid/vapour phase changes take place. This unpredictable aging can lead to incomplete phase changes for this water, which generates Rankine cycle loop dysfunction.

In other Rankine cycle closed loop types, this additive-containing water is replaced by pure water with very good energy recovery properties.

However, using such pure water does not prevent freezing in any way when the ambient air is at very low temperatures.

Freezing can cause irreversible damage to the loop constituents, such as exchanger cracking, pump destruction or even bursting of the pipes connecting the constituents.

As better described in French patent application No. 2,956,153, the applicant has overcome these drawbacks by providing a device and a method that prevent this water from freezing.

The working fluid is therefore drained off the closed loop and collected in a storage tank when this loop is at standstill.

The applicant has improved this device even further so as to facilitate emptying of the closed loop in a simple and economical manner to prevent the water from freezing, without using the circulation pump. Indeed, the circulation pump of the closed loop does not functionally allow complete emptying and filling of this loop, its technology often requiring unidirectional operation under load.

SUMMARY OF THE INVENTION

The invention thus relates to a device for controlling a working fluid with low freezing point circulating in a closed loop working on a Rankine cycle, said loop comprising a compression/circulation pump for the fluid in liquid form, a heat exchanger swept by a hot source for evaporation of said fluid, expansion means for the fluid in vapour form, a cooling exchanger swept by a cold source for condensation of the working fluid, a working fluid tank and working fluid circulation lines, characterized in that the tank is connected to a depression generator.

The depression generator can be a vacuum pump.

The closed loop can comprise controlled vent-to-atmosphere means.

At least one of the circulation lines of the loop can comprise controlled vent-to-atmosphere means.

The tank can comprise controlled vent-to-atmosphere means for the inside of said tank.

The closed loop can comprise a pump bypass circuit.

The bypass circuit can comprise a bypass line carrying controlled throttle means.

The tank can comprise a temperature detector for the fluid it contains.

The closed loop can comprise a temperature detector arranged close to the pump inlet.

The closed loop can comprise a circulation line carrying controlled throttle means for connecting the condenser outlet to the tank inlet and a circulation line carrying controlled throttle means for connecting the tank outlet to the pump inlet.

The working fluid can be water without an antifreeze additive.

The invention also relates to a method of controlling a working fluid with low freezing point circulating in a closed loop working on a Rankine cycle, said loop comprising a compression/circulation pump for the fluid in liquid form, a heat exchanger swept by a hot source for evaporation of said fluid, expansion means for the fluid in vapour form, a cooling exchanger swept by a cold source for condensation of the working fluid, a working fluid tank and working fluid circulation lines, characterized in that it consists, when the loop is at standstill, in generating a depression inside the tank so as to transfer the working fluid contained in said loop to this tank.

The method can consist in generating a depression inside the tank using a vacuum pump.

The method can consist in transferring the fluid to the tank when the temperature of the working fluid at the pump inlet is below a threshold temperature.

The method can consist in isolating the tank from the circuit after transferring the working fluid.

The method can consist, upon starting operation of the loop again, in withdrawing the working fluid contained in the tank so as to fill the closed loop.

The method can consist in withdrawing the fluid from the tank when the temperature of the working fluid in this tank is above a threshold temperature.

BRIEF DESCRIPTION OF THE SOLE FIGURE

Other features and advantages of the invention will be clear from reading the description hereafter, given by way of non limitative example, with reference to the accompanying sole figure that shows a device for controlling a working fluid of a closed loop working on a Rankine cycle.

DETAILED DESCRIPTION

In this figure, Rankine cycle closed loop 10 comprises a compression and circulation positive-displacement pump 12 for a working fluid, referred to as the pump in the rest of the description, with an inlet 14 for the working fluid in liquid form and an outlet 16 for this working fluid, also in liquid form, but compressed at high pressure. This pump is advantageously driven in rotation by an electric motor (not shown).

This loop also comprises a heat exchanger 18, referred to as evaporator, traversed by the compressed working fluid between an inlet 20 for this liquid fluid and an outlet 22 through which the working fluid flows out of this evaporator in form of compressed vapour. This evaporator is swept by a hot source 24 coming from the exhaust gas circulating in exhaust line 26 of an internal-combustion engine 28, and more particularly an engine for motor vehicles.

This loop also comprises an expansion machine 30 receiving through its inlet 32 the working fluid in form of high-pressure compressed vapour, this fluid flowing out through outlet 34 of the machine in form of low-pressure expanded vapour.

This machine also comprises a short-circuit outlet 36 for the working fluid in high-pressure compressed vapour form, allowing this expansion machine to be deactivated upon passage of the vapour between inlet 32 and short-circuit outlet 36.

Advantageously, this expansion machine can come in form of an expansion turbine whose rotor is driven in rotation by the working fluid in vapour form while driving a connecting shaft 38. Preferably, this shaft allows to transmit the energy recovered to any transformer device such as, for example, an electric generator 40.

This expansion machine can also be a reciprocating piston or a rotary piston machine whose output shaft is connected to the transformer device.

The loop also comprises a cooling exchanger 42, or condenser, with an inlet 44 for the expanded low pressure vapour and an outlet 46 for the working fluid converted to liquid form after passing through this condenser. The condenser is swept by a cold source, generally a cold air stream (arrow F) at ambient temperature, in order to cool the expanded vapour so that it condenses and is converted to liquid. Of course, any other cold cooling source such as water can be used to provide condensation of the vapour.

This loop also comprises a closed tank 48 allowing to keep the working fluid in the liquid state even when the ambient outside temperature is at a level that might cause freezing thereof.

This tank includes a depression generator such as a vacuum pump 50 that is connected to the inside of the tank. Advantageously, this vacuum pump is driven in rotation by an electric motor (not shown).

The various elements of the loop are connected to each other by fluid circulation lines 52, 54, 56, 58, 60, 62, 64 allowing to successively connect the pump to the evaporator (evaporator line 52), the evaporator to the expansion machine (machine line 54), this machine to condenser line 56 connected to the condenser inlet, either by short-circuit line 58 connected to short-circuit outlet 36, or by line 60 connected to the low-pressure expanded vapour outlet 34 thereof, the condenser to the tank (tank line 62), and the tank to the pump (pump line 64) so that the working fluid circulates in the direction shown by arrows A.

The loop also comprises a bypass loop 66 bypassing pump 12 with a bypass line 68 connecting inlet 14 of this pump directly to outlet 16 thereof.

Preferably, the loop can comprise an expansion vessel 70 allowing to absorb the volume variation of the working fluid circulating in the loop.

Controlled throttle means 72, 74, 76, 78 in form of circulation valves are respectively arranged on line 58 (short-circuit valve 72), on line 62 (tank upstream valve 74), on line 64 (tank downstream valve 74) and on line 68 (bypass valve 78) so as to control the circulation of the working fluid in these lines.

Furthermore, controlled throttle means with automatic air discharge 80, referred to as automatic air trap in the rest of the description, are arranged on machine line 54 while controlled vent-to-atmosphere means 82 and 84, also in form of valves here, are respectively arranged on short-circuit line 58 and downstream from throttle means 72, and in the upper part of tank 48, thus allowing the inside of this line and/or of the tank to communicate with the open air.

In the loop illustrated in the figure, a temperature detector 86 is arranged inside the tank, advantageously in the centre thereof, for measuring the temperature of the working fluid contained therein, and another temperature detector 88 is arranged on line 64 next to pump inlet 14 for measuring the temperature of the working fluid at the inlet of this pump and downstream from circulation valve 76.

It is also advantageous, but not obligatory, for the closed loop to be connected to a loop drain device 90 with a drain line 91 coming from bypass line 68 and carrying a drain valve 92, in form of a cock, which is used to extract the working fluid from this loop during maintenance operations.

The upper point and the lower point of the loop are mentioned in the rest of the description. This corresponds to the configuration of the figure where tank 48 and pump 12 are arranged at the lower point, i.e. below expansion machine 30 that is considered to be at the upper point.

Similarly, the terms upstream and downstream are considered with respect to the direction of circulation of the working fluid shown by arrows A in the figure.

As illustrated in this figure, exhaust line 26 runs through the evaporator between an exhaust gas inlet 94 and a gas outlet 96. Exhaust pipe 98 connecting the engine to gas inlet 94 carries a controlled throttle means 100. A short-circuit line 102 carrying another controlled throttle means 104 connects exhaust pipe 98 to exhaust pipe 106 connected to gas outlet 96.

Of course, the circulation valves and the vent-to-atmosphere valves are controlled by any known means, such as electric motors, under the supervision of a control unit and more particularly of the calculator of the internal-combustion engine.

This control unit also controls the motors driving circulation pump 12 and vacuum pump 50.

Furthermore, this unit receives information essentially coming from various detectors provided in this loop, such as water (or water vapour) pressure detectors and temperature detectors 86, 88. The unit controls elements of the loop from the information received so as to obtain the desired operating range.

In the rest of the description, the working fluid with low freezing point circulating in this loop is water. This water has the specific feature of being pure and of comprising no additive and, more particularly, no additive preventing freezing thereof. Any other (liquid/vapour) phase change fluid without antifreeze additive, which can freeze at low temperature (around 0° C.), can be used as the working fluid, such as organic fluids for example.

Under standard operating conditions, the water circulates in the loop clockwise (arrows A) when considering the figure.

Short-circuit valve 72 therefore closes line 58, tank upstream and downstream valves 74 and 76 are in open position of lines 62 and 64, and bypass valve 78 closes bypass line 68. Vent-to-atmosphere valves 82 and 84 are in closed position, as well as drain valve 92 and automatic trap 80.

Valve 100 of exhaust line 98 is in open position, thus allowing the exhaust gas to circulate in the evaporator between inlet 94 and outlet 96, and short-circuit valve 104 is in closed position.

Vacuum pump 50 is inactive and circulation pump 12 is driven in rotation by its electric motor controlled by the control unit.

In this configuration, the water leaves pump 12 in form of a compressed liquid. This compressed water circulates in line 52 and reaches inlet 20 of evaporator 18. This compressed water flows through the evaporator so as to be converted to vapour under the effect of the heat sweeping this evaporator and coming from the exhaust gas. The water vapour flowing from the evaporator is carried by line 54 and flows through expansion machine 30, between inlet 32 and outlet 34 thereof, while transmitting thereto the energy it contains. The expanded water vapour leaving this expansion machine circulates in line 60 and into condenser line 56. This water vapour flows through condenser 18 where it is converted to liquid water. This liquid water is then brought through line 62 to the inlet of tank 48. This tank being a closed tank, the water simply flows therethrough without filling it and it flows out through line 64 prior to reaching inlet 14 of pump 12.

When engine 28 is at standstill, the calorific energy of the exhaust gas used for the heat exchange in evaporator 18 is no longer provided. In this situation, loop 10 is no longer operational and switches to "Standby mode".

During this standby phase, the closed loop recovers no more thermal energy from the exhaust gas. Under such conditions, the circulation of the working fluid is interrupted after the circulation pump has been stopped by the control unit. This unit controls the opening of short-circuit valve 72 of line 58, which causes expansion machine 30 to stop. Vent-to-atmosphere valves 82 and 84 are in closed position, as well as automatic trap 80.

The loop remains in standby mode as long as the temperature of the water, measured by detector 88 at inlet 14 of circulation pump 12, does not fall below a temperature threshold To, of the order of 5° C. here.

It can be noted that the coldest point in the loop is defined as the point at the inlet of pump 12. Indeed, this point, where detector 88 is located, is the point with the fastest temperature drop in the loop when the water is not circulating any more and no more calorific energy is supplied by the engine exhaust gas.

As soon as the measured temperature is below threshold temperature To, the loop is activated by the control unit into a "Frost mode".

In this "Frost mode", valves 72 and 78 are respectively controlled so as to open short-circuit line 58 and bypass line 68. Valves 74 and 76 are controlled so as to open lines 62 and 64, and vent-to-atmosphere valve 84 of tank 48 is in closed position. Automatic trap 80 is kept in a position where communication with the open air is closed whereas vent-to-atmosphere valve 82 is in open position.

Vacuum pump 50 is actuated and, considering the closed position of vent-to-atmosphere valve 84, a depression is generated within the tank. This therefore allows the working fluid contained in the whole loop to be sucked into tank 48.

Advantageously, emptying the loop can be done by circulating the working fluid in the direction of arrows A between expansion machine 30 and tank 48 (short-circuit line 58-condenser line 56-condenser 42-tank line 62) and in the opposite direction to arrows A between this expansion machine and the tank (machine line 54-evaporator 18-evaporator line 52-bypass line 68-pump line 64).

Of course, the person skilled in the art is able to calculate the time when driving vacuum pump 50 is stopped so as to completely drain of the working fluid from the loop and to store it in the tank.

As soon as the loop is emptied of its working fluid that is replaced by air conveyed through vent-to-atmosphere valve 82, valves 74 and 76 are controlled so as to close lines 62 and 64. This allows tank 48 to be isolated from the rest of the loop.

After closure of valves 74 and 76, vacuum pump 50 is stopped and vent-to-atmosphere valve 84 of tank 48 is controlled into open position so as to put the inside of this tank under atmospheric pressure.

This allows to completely drain off through gravity, considering the position at the lower point of the tank, and through suction under the effect of the depression generated by the vacuum pump, the working fluid contained in the loop and to store it in the tank.

This tank is advantageously designed to withstand freezing of the fluid it contains. By way of non limitative example, the working fluid stored in the tank can be protected against risks of frost through insulation of the tank that thermally insulates it from the ambient air.

This emptying operation is thus carried out without rotation of circulation pump 12 whose functional and technical characteristics are not suited to a loop emptying operation.

Preferably, at the end of this emptying operation, the non-functional valves of the loop are put on freeze protection mode. More precisely, valves 72, 78, 100 and 104, as well as vent-to-atmosphere valve 82 and automatic trap 80, are put on or kept in open position.

When thermal engine 28 is started again, the closed loop is operated in "Defrost mode".

This mode is operated only when the temperature measured by temperature detector 86 of the tank is above temperature threshold To set around 5° C. For this "Defrost mode", it is considered that the centre of the tank is the point with the slowest working fluid temperature rise, considering the thermal inertia linked with the amount of fluid present.

For this mode, the upstream and downstream tank valves 74 and 76 are controlled so as to open lines 62 and 64, and vent-to-atmosphere valve 84 is in open position. Bypass valve 78 is closed, as well as valve 100 of exhaust line 98, whereas valve 104 of short-circuit line 102 is open. Automatic trap 80 is controlled in open position, vent-to-atmosphere valve 82 is closed and short-circuit valve 72 is open. Circulation pump 12 is actuated and the working fluid contained in the tank, here in form of liquid water, is withdrawn from the tank so as to fill the loop. More precisely, this fluid is conveyed through line 62, it circulates in evaporator 18 and flows through expansion machine 30 between inlet 32 and short-circuit outlet 36 prior to circulating in short-circuit line 58 (arrows A'). The fluid then circulates in line 56, condenser 42 and line 62 before it reaches the inlet of tank 48. The fluid then flows through the tank and reaches inlet 14 of pump 12.

Along the circulation of the water, purging the air present in the various elements (lines, evaporator, etc.) of the loop is done by means of automatic trap 80, and vent-to-atmosphere valve 84 of tank 48 allows the water level drop within the tank to be compensated by air.

As for the loop emptying operation, the person skilled in the art is able to determine the time required for filling the loop, notably according to the delivery of the circulation pump and to the volume of fluid in the loop.

When the entire loop is filled with water, valve 104 is controlled in closed position, valve 100 of exhaust line 98 is in open position, and automatic trap 80 and short-circuit valve 72 are closed.

The exhaust gases from engine 28 thus flow through evaporator 18 while exchanging the calories they contain with the water circulating in evaporator 18 by converting this water to vapour.

When the amount of vapour is sufficient, short-circuit valve 72 is put on closed position, which actuates expansion machine 30 through the circulation of water vapour between inlet 32 and outlet 34 of this machine.

After this stage, the loop is brought back to nominal operating conditions as described above.

The invention claimed is:

1. A method of controlling a working fluid with low freezing point circulating in a closed loop working on a Rankine cycle, said loop comprising:
    a compression/circulation pump for the fluid in liquid form,
    a heat exchanger swept by a hot source for evaporation of said fluid,
    expansion means for the fluid in a vapour form,
    a cooling exchanger swept by a cold source for condensation of the working fluid,
    a working fluid tank and
    working fluid circulation lines, said method comprising:
        when the loop is at standstill, generating a depression inside the tank so as to transfer the working fluid contained in said loop to the tank, wherein the fluid is transferred to the tank when the temperature of the working fluid at an inlet of the pump is below a threshold temperature.

2. A method as claimed in claim 1, wherein generating a depression inside the tank is accomplished using a vacuum pump.

3. A method of controlling a working fluid with low freezing point circulating in a closed loop working on a Rankine cycle, said loop comprising:
    a compression/circulation pump for the fluid in a liquid form,
    heat exchanger swept by a hot source for evaporation of said fluid,
    expansion means for the fluid in a vapour form,
    a cooling exchanger swept by a cold source for condensation of the working fluid,
    a working fluid tank and
    working fluid circulation lines, said method comprising:
        when the loop is at standstill, generation a depression inside the tank so as to transfer the working fluid contained in said loop to the tank; and
        isolating the tank from the loop after transferring the working fluid.

4. A method of controlling a working fluid with low freezing point circulating in a closed loop working on a Ramkine cycle, said loop comprising:
    a compression/circulation pump for fluid in liquid form,
    a heat exchanger swept by a hot source for evaporation of said fluid,
    expansion means for the fluid in vapour form,
    a cooling exchanger swept by a cold source for condensation of the working fluid,
    a working fluid tank and
    working fluid circulation lines, said method comprising:
        when the loop is at standstill, generating a depression inside the tank so as to transfer the working fluid contained in said loop to the tank;
        upon starting operation of the loop again, withdrawing the working fluid contained in the tank so as to fill the closed loop; and
        withdrawing the fluid from the tank when a temperature of the working fluid in the tank is above a threshold temperature.

5. A device for controlling a working fluid with low freezing point circulating in a closed loop working on a Rankine cycle, comprising:
    the closed loop working on a Rankine cycle, the closed loop comprising:
        a compression/circulation pump for the fluid in liquid form,
        a heat exchanger swept by a hot source for evaporation of said fluid,
        expansion means for the fluid in vapour form,
        a cooling exchanger swept by a cold source for condensation of the working fluid,
        a working fluid tank, and
        working fluid circulation lines, and
    a depression generator connected to said tank configured to generate a depression in said tank to suck said fluid into said tank,
    characterized in that said working fluid circulation lines comprise a circulation line carrying controlled throttle means for connecting an outlet of said condenser to an inlet of said tank and a circulation line carrying controlled throttle means for connecting an outlet of said tank to an inlet of said pump.

6. A device as claimed in claim 5, characterized in that the depression generator is a vacuum pump.

7. A device as claimed in claim 5, characterized in that said tank comprises a temperature detector for the fluid contained therein.

8. A device as claimed in claim 5, characterized in that said closed loop comprises a temperature detector arranged close to an inlet of said pump.

9. A device as claimed in claim 5, characterized in that the working fluid is water without an antifreeze additive.

10. A device as claimed in claim 5, characterized in that the closed loop comprises a bypass circuit bypassing said pump.

11. A device as claimed in claim 10, characterized in that said bypass circuit comprises a bypass line carrying controlled throttle means.

12. A device as claimed in claim 5, characterized in that said closed loop comprises controlled vent-to-atmosphere means.

13. A device as claimed in claim 12, characterized in that said controlled vent-to-atmosphere means is connected to at least one of the circulation lines of the loop.

14. A device as claimed in claim 12, characterized in that said controlled vent-to-atmosphere means is connected to the inside of said tank.

15. A device for controlling a working fluid circulating in a closed loop working on a Rankine cycle, comprising:
   the closed loop working on a Rankine cycle, the closed loop comprising:
      a working fluid tank,
      a heat exchanger connected by a first circulation line to the working fluid tank and being configured to be swept by a hot source for evaporation of the working fluid,
      a pump for compressing and pumping the working fluid in a liquid form from the working fluid tank to the heat exchanger through the first circulation line,
      an expansion machine connected to the heat exchanger by a second circulation line for expanding the working fluid in vapour form,
      a cooling exchanger connected to the expansion machine by a third circulation line and being configured to be swept by a cold source for condensing the working fluid, and
      a fourth circulation line connecting the cooling exchanger to the working fluid tank, and
   a depression generator connected to the working fluid tank and being configured to generate a depression in the working fluid tank to suck the working fluid into the working fluid tank,
   a temperature detector configured to measure a temperature of the working fluid in the loop between the working fluid tank and the pump, and
   a control unit responsive to a temperature of the working fluid measured by the temperature detector for controlling the depression generator to suck the working fluid into the working fluid tank when the temperature of the working fluid between the working fluid tank and the pump approaches a freezing point of the working fluid.

16. A device as claimed in claim 15, wherein the depression generator is a vacuum pump.

17. A device as claimed in claim 15, characterized in that the working fluid is water without an antifreeze additive.

* * * * *